March 4, 1958  L. SZILARD ET AL  2,825,689
NEUTRONIC REACTOR AND FUEL ELEMENT THEREFOR
Filed April 25, 1946

Witnesses:
Herbert E. Metcalf
Francis W. Test

Inventors:
Leo Szilard
Gale J. Young
By Robert A. Lavender
Attorney

── # United States Patent Office 2,825,689
Patented Mar. 4, 1958

2,825,689

NEUTRONIC REACTOR AND FUEL ELEMENT THEREFOR

Leo Szilard, Chicago, Ill., and Gale J. Young, Hawthorne, N. Y., assignors to the United States of America as represented by the United States Atomic Energy Commission Application April 25, 1946, Serial No. 664,732

2 Claims. (Cl. 204—193.2)

This invention relates to neutronic reactors and to novel articles of manufacture used in and in combination with such reactors. In neutronic reactors a neutron fissionable isotope such as $U^{233}$, $U^{235}$ or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944, now U. S. Patent No. 2,708,656.

In the operation of neutronic reactors at a substantial power, for example, 1000 kilowatts or more, for more than a few minutes, difficulty has been encountered due to the fact that the moderator and/or coolant became radioactive during the operation of the reactor. This seriously complicates operation of the reactor since the radioactivity of the coolant and moderator may constitute a serious hazard to personnel.

In accordance with the present invention, an improved neutronic reactor has been produced whereby the tendency of the moderator and/or coolant to become radioactive is substantially minimized. It has been found that this result may be secured by interposing a solid non-fissioning barrier between the fissioning isotope and the coolant or moderator or both. Notwithstanding the fact that introduction of non-fissioning material into a neutronic reactor absorbs neutrons and therefore may tend to prevent establishment of a neutron chain reaction, it has been discovered that it is possible to insert non-fissioning barriers into the reactor, and to so proportion the thickness of the barrier to prevent passage of all or a preponderant amount of fission fragments from the fissioning isotope into the moderator and/or coolant while yet avoiding use of such a quantity of barrier that the neutron absorption thereof prevents establishment or maintenance of the neutron chain reaction. The barrier itself should be constructed of a material or materials having a low neutron capture cross-section. Metallic aluminum and beryllium are particularly good materials for this purpose.

While the barrier may be interposed in various ways, a particularly advantageous structure involves the use of a non-fissioning enclosure about the fissioning isotope. In order to promote heat transfer from the fissioning isotope through the barrier to the contacting moderator and/or coolant, the barrier should be in close intimate contact with the fissioning composition. Generally, special precautions are observed for this purpose. Thus, a shell forming the non-fissioning barrier may be shrunk upon the fissioning component which preferably is in the metallic state. These enclosed fissionable components may be used as the active component of a neutronic reactor, and frequently are located in contact with a coolant such as a gas or liquid coolant for removal of heat from the reactor. Where the coolant has a corrosive effect upon the fissionable metal or other material, the non-fissioning sheath also serves to protect the fissionable material. In such a case, every precaution must be taken to prevent the existence of pores in the sheath through which the coolant may enter. Frequently sheaths are hermetically sealed about the fissionable material in order to seal the material from the coolant. In a particularly advantageous modification of the invention, the enclosed fissionable bodies are disposed within channels in the moderator through which the coolant is permitted to flow. This coolant may flow externally or internally or externally and internally of the fissionable component.

Lengths or rod segments of the fissionable bodies generally are disposed in channels extending through or at least into the moderator. During the chain reaction the central interior portion of these bodies frequently rises to a temperature much above the temperature of the body exterior which is in close relationship with the coolant. This condition may lead to serious difficulty in a system where a plurality of fissionable bodies are laid end to end through the channels in the moderator and where coolant, particularly a liquid coolant such as water, is passed in contact with the fissionable bodies or sheathed fissionable bodies. In such a case the ends of each length may be at a temperature substantially higher than the temperature of the sides thereof, and thus the coolant contacting the ends may become seriously overheated and caused to boil. Such boiling could produce an exceedingly hazardous condition in an operating neutronic reactor.

In accordance with the present invention, this difficulty may be avoided or at least partially eliminated by providing the ends of such lengths of fissionable material with means to prevent the temperature of the ends from reaching an excessive value. This may be done by providing the ends with highly conductive end caps or other means for facilitating heat transfer to the circumference of the elongated bodies. Such intervening segments of heat conductive material improve the heat transfer to the coolant and prevent overheating. An especially effective embodiment of the invention comprises a neutron moderator with channels therein, coolant passing through the channels and fissionable bodies in the form of elongated segments laid end to end in the channels and enclosed in a non-fissioning enclosure and heat conducting means between adjoining segments.

Accomplishment of the foregoing constitutes some of the principal objects and advantages of the invention, others of which will become apparent from the following description and drawings, in which.

A complete description of a neutronic reactor in which the present invention is applicable is not given herein as the details of the reactor form no part of the present invention. The invention has to do with the body of fissionable material that is disposed in the reactor, and for a more thorough understanding of the reactor details, reference may be had to the aforementioned co-pending application of Enrico Fermi and Leo Szilard.

Figure 1:
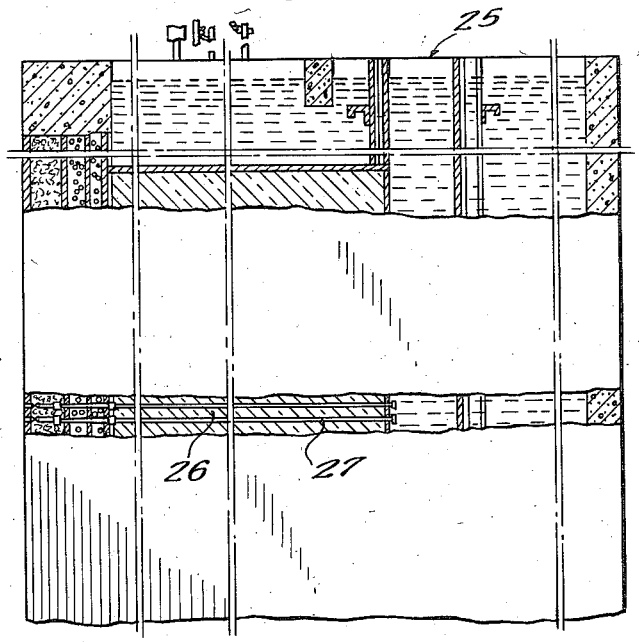
Fig. 1 is a diagrammatic, longitudinal sectional view, partly in elevation, of a liquid cooled neutronic reactor.
Figure 2:
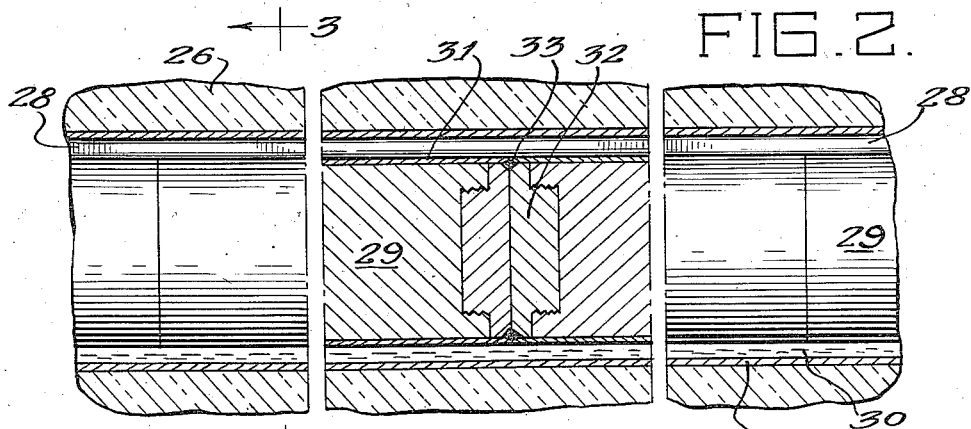
Fig. 2 is an enlarged fragmentary longitudinal sectional view through one of the cooling tubes disposed in the neutronic reactor showing partially in section and partly in elevation at least portions of three bodies of fissionable material disposed in the tube.
Figure 3:
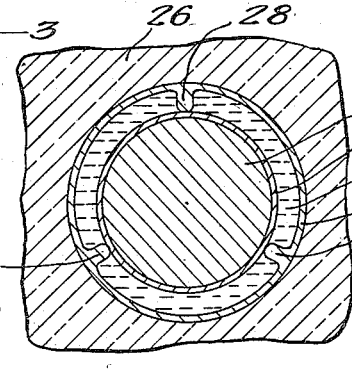
Fig. 3 is a transverse sectional view through the tube, the view being taken on the line 3—3 of Fig. 2.

For purposes of gaining an understanding of the present invention a more or less diagrammatic showing of a neutronic reactor is presented in Figure 1 where the reactor is illustrated generally at 25 and includes a body of moderating material such as graphite 26 through which are disposed a plurality of hollow tubes 27 of aluminum or other suitable material. Each of these tubes 27 as shown in Fig. 3 is provided with a plurality of longitudinally extending ribs 28 projecting inwardly on the inner walls of the tube. Supported on the ribs 28 are bodies of fissionable material 29 that are arranged end to end as shown in Figure 2 substantially throughout the length of each tube 27. As previously mentioned the bodies of fissionable material 29 are in the form of short segments and for purposes of illustration these bodes of fissionable material may comprise natural uranium. For purposes of illustration bodies 29 are hereinafter referred to as uranium bodies.

As a result of the neutronic reaction that takes place in the neutronic reactor 25 heat is generated inside the uranium bodies 29 and when the reactor is operated at high neutron densities over a period of time considerable heat must be carried away from the bodies in order to prevent the temperature inside the neutronic reactor from exceeding desired limits. Thus a coolant indicated at 30 in Figure 3 may be circulated through each of the tubes 27 in the spaces between the uranium bodies 29 and the walls of the tube 27. Each of the uranium bodies 29 is encased in aluminum as previously explained and on the sides of each body 29 the aluminum indicated at 31 in Fig. 3 is in the form of a jacket 31 that fits snugly over each uranium body. The ends of this jacket 31 are open and each may be closed by a relatively thick cap 32 of an efficient heat conducting material such, for example, as aluminum. As shown in Fig. 2 this cap 32 may be threaded into the uranium body 29. The jacket 31 as shown projects beyond each end of the uranium body 29 so that the cap 32 may be entirely nested within the walls formed by this extension of jacket 31. Suitable means indicated at 33 may be used to bond the tube 31 to the end cap 32.

It is apparent from Figure 2 for example that considerable heat may be concentrated along the central longitudinal axis of each of the uranium bodies 29 adjacent to their ends because of the fact that the coolant 30 that normally flows rapidly along the tube 27 comes in contact only with the outer side walls of jackets 31 surrounding the uranium bodies 29. With the relatively thick end caps 32 at the ends of the uranium bodies 29 there is ample opportunity for heat generated along the central longitudinal axis of bodies 29 to be conducted through these end caps to the jackets 31 and the coolant can then extract the heat and conduct it from the reactor 25.

Thus the present invention provides a relatively simple means for preventing the accumulation of heat at the ends of the adjacent uranium bodies 29. This eliminates the opportunity for corrosion to take place due to excessive heat between adjacent bodies.

Though only one embodiment of the present invention has been selected for purposes of illustration, it is recognized of course that many modifications may appear to a man skilled in the art. Materials other than aluminum for example may be used as the enclosure for the uranium bodies and for the end caps 32. Aluminum, however, is a relatively good conductor of heat and also has neutron capture characteristics that can be tolerated in a reactor.

What is claimed is:

1. A fuel element for a neutronic reactor comprising an elongated solid body of natural uranium fitting within an aluminum jacket, closed at both ends by relatively thick aluminum caps, of substantially greater thickness throughout their width than the jacket walls, the caps fitting snugly within the jacket and being threaded into the uranium body, and the caps being in solid to solid thermal contact throughout the cross section of the uranium.

2. A neutronic reactor comprising a body of graphite having disposed therein a plurality of hollow tubes of aluminum, elongated solid bodies of natural uranium fitting within an aluminum jacket, closed at both ends by relatively thick aluminum caps, of substantially greater thickness throughout their width than the jacket walls, placed end-to-end in the aluminum tubes, the caps fitting snugly within the jacket and being threaded into the uranium body, the caps being in solid to solid thermal contact throughout the cross section of the uranium; and means for flowing a coolant fluid through the said aluminum tubes past the uranium bodies, said bodies of graphite and uranium being so constructed and arranged as to produce a self-sustaining neutronic chain reaction.

References Cited in the file of this patent

UNITED STATES PATENTS 2,708,656    Fermi et al. _____ May 17, 1955

FOREIGN PATENTS 233,011    Switzerland _____ Oct. 2, 1944
861,390    France _____ Oct. 28, 1940

OTHER REFERENCES

Smyth: "Atomic Energy for Military Purposes," pp. 83, 103 and 106, August 1945.

Kelly et al.: Physical Review, 73, 1135–9 (1949).